March 6, 1962 P. E. GIRTON 3,024,431
WATER COOLED WELDING TRANSFORMER
Filed Sept. 23, 1957 2 Sheets-Sheet 1
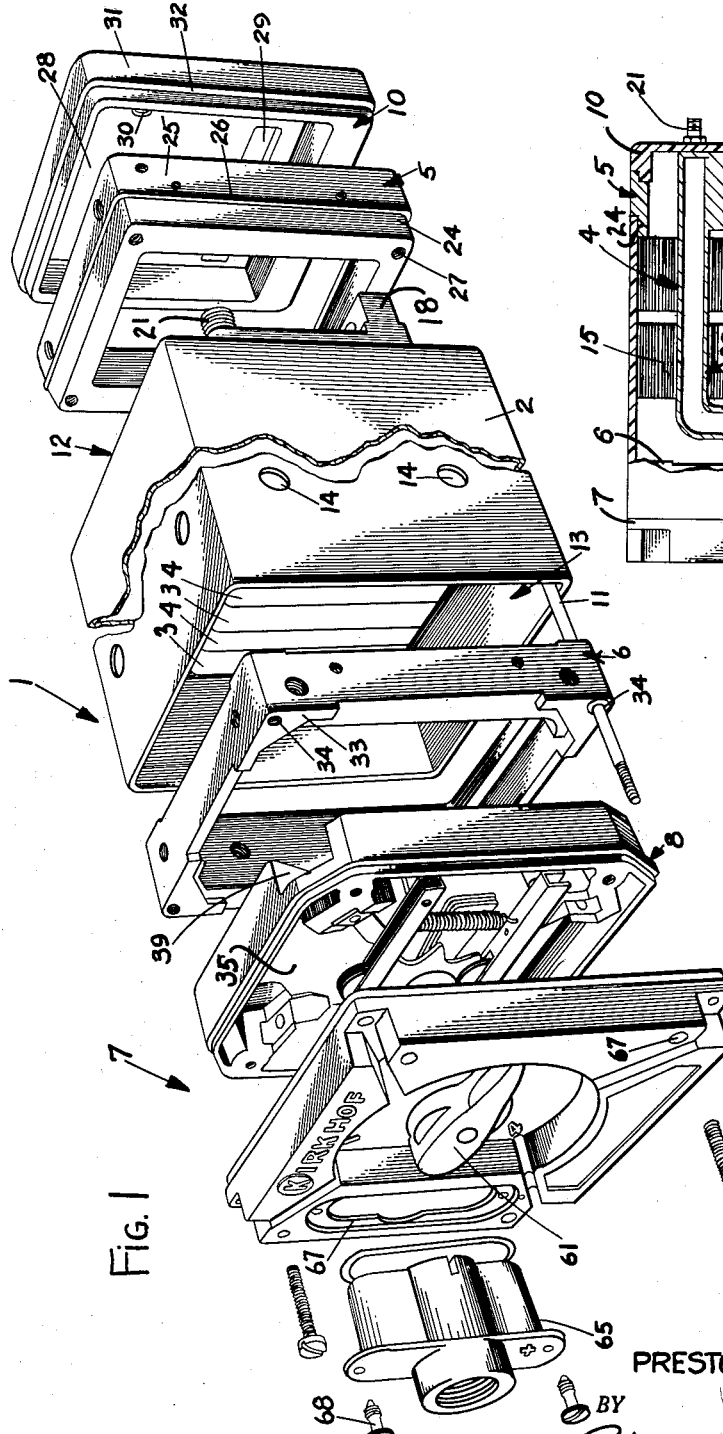
INVENTOR.
PRESTON E. GIRTON
BY
ATTORNEYS March 6, 1962 P. E. GIRTON 3,024,431
WATER COOLED WELDING TRANSFORMER
Filed Sept. 23, 1957 2 Sheets-Sheet 2

INVENTOR.
PRESTON E. GIRTON
BY
ATTORNEYS

United States Patent Office 3,024,431
Patented Mar. 6, 1962

3,024,431
WATER COOLED WELDING TRANSFORMER
Preston E. Girton, Grand Rapids, Mich., assignor to Kirkhof Manufacturing Corporation, Grand Rapids, Mich., a corporation of Michigan
Filed Sept. 23, 1957, Ser. No. 685,479
5 Claims. (Cl. 336—62)

This invention relates to a water cooled transformer and more particularly to a water cooled welding transformer having an entirely closed and sealed tap switch housing for controlling the operation of the transformer.

Welding transformers for use in resistance welding require tremendously high currents which create heat in the unit. As a result, some type of cooling means is required. One common cooling method is to continuously flow water through a secondary coil which is constructed of coils of highly conducted metal, such as copper, having water passageways. Cooling by water has created several problems. The most outstanding of these is the escape of water and moisture to the electrical components of the primary selector switch which is commonly referred to as a "tap switch." The moisture creates paths of least resistance between the various electrical components, short circuiting the tap switch which is detrimental to the operation of the unit and sometimes can prove to be dangerous. The short circuit often damages the entire unit beyond repair, necessitating the replacement of the transformer. This creates a costly maintenance problem. Further, damage to the transformer unit results in the shutdown of the entire welding equipment which is quite costly because of the loss of man-hours.

To my knowledge, the transformer industry has failed to solve this problem. The object of this invention is to provide a transformer having a completely water and moisture tight housing which eliminates the problems mentioned above.

Another object of this invention is to provide a water cooled transformer having a non-conductive, impervious, and water and vapor tight sealed tap switch housing which eliminates the difficulties listed above.

Still another object of this invention is to provide a water cooled transformer having a baffle located in the housing of the transformer between the coils and the switch mechanism for controlling the operation of the transformer. The baffle has a cover completely sealing the electrical switch components so that they are not effected by the water and moisture in the secondary coil.

Other objects of my invention will become obvious upon reading the following specification in conjunction with the accompanying drawings, wherein:

FIG. 1 is a side, elevational, exploded, oblique view of the transformer of this invention.

FIG. 2 is a sectional, side view of the transformer illustrating the position of the various components of the transformer.

Figure 5:
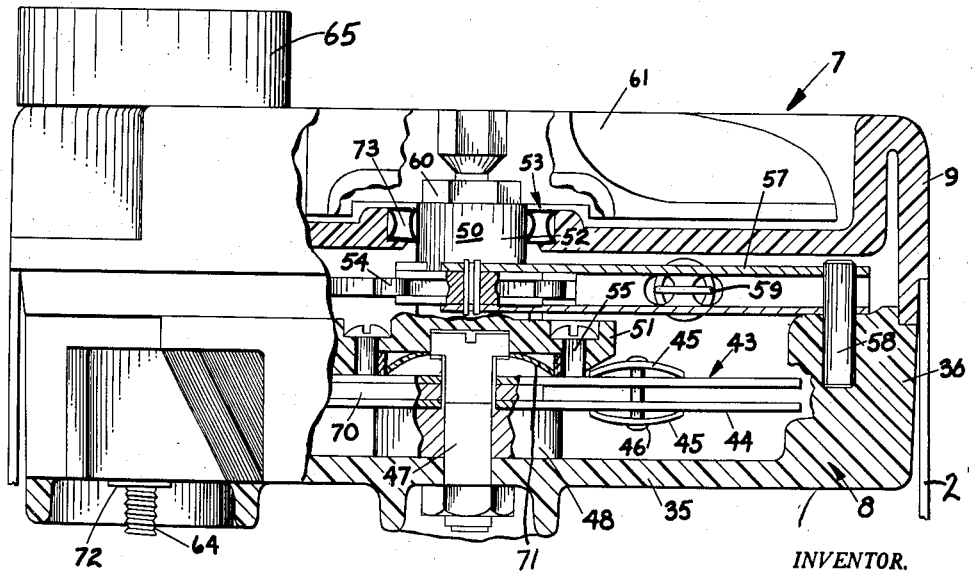

FIG. 5 is a side elevational view of the tap switch housing partially cut away to show various components of the tap switch and the arrangement of the cover on the base or baffle. Throughout this application the term "tap switch" has been used in reference to a primary selector switch which selects the voltage on the primary and as a result the voltage output of the transformer. This term is utilized because it is a general term used in the welding art.

Briefly, this invention relates to a water cooled transformer having a casing with a primary and secondary in the casing. The secondary is a highly conductive metallic coil having a water passageway for cooling the same. It has an electrode end or lug protruding from end of the casing. The primary and secondary terminate short of the other end of the casing in which is located a water and vapor tight tap switch housing. This tap switch housing contains circuit breaker means electrically connected to the primary for controlling the operation of the transformer. As a result of this construction, the tap switch components are always free from the moisture given off by the secondary. This eliminates any short circuiting of the components and the resultant damage.

Referring to the drawings, reference numeral 1 denotes the entire transformer unit having a shell 2 in which is located the primary coils 3 and the secondary coils 4 (FIG. 2). The coils are held in the shell or skin 2 by the front body clamp 5 and the rear body clamp 6. Rearwardly of the rear body clamp 6 is the tap switch housing 7 consisting of the cup-shaped baffle 8 and a cover 9. The front of the unit, shown at the extreme right in FIG. 1, is covered by the front cover plate 10. The shell 2, primary 3, secondary 4, clamps 5 and 6 and the tap switch housing 7 are clamped and held together by the tie bolts 11 extending through openings in the respective members.

The shell or skin 2 is a rectangular elongated housing constructed of steel sheeting. The attachment holes 14 are provided to receive bolts for securing the transformer to a support. Both ends 12 and 13 of the shell are open permitting the shell to be telescoped over the primaries and secondaries during assembly.

Each primary is a looped formed by wrappings of a metal band. There are three primary coils connected in series. The primaries are connected to the terminals of the tap switch to provide different voltage outputs. The two secondary loops 4 are constructed of square tubing bent to conform to the shape of the primary loops. The secondary coils 4 each comprise a loop 16 terminating at the lugs 18 which form electrodes to which the shunts of welding guns are to be connected. The loops each have a continuous passageway 20 leading from a port 21. The passageways are connected together by an insulated conduit (not shown) providing a continuous path for the flow of water into one port through the water passageways 20 of both secondary coils and out of the other port.

The primary and secondary coils are arranged side by side with a primary coil 3 on each side of a secondary coil 4 (FIG. 1). The transformer is of the Hipersil type. Therefore, it has U-shaped iron cores 15 secured about the primaries and secondaries with their ends together.

The front body clamp has two portions 24 and 25. The portion 24 is of smaller cross section than 25 and is adapted to receive the end 12 of the shell 2. The juncture between the two portions forms a shoulder 26 which abuts against the front edge of the shell. Openings 27 are provided for receiving the tie bolts 11.

The front cover plate 10 includes a face plate 28 having the lug openings 29 and water conduit openings 30. The sides 31 are stepped, forming the shoulder 32. The rearmost portion of the front cover plate is adapted to seat in the front opening of body clamp 5 with the shoulder 32 seated against the clamp 5. When completely assembled, the outer surface of the shell 2, clamp portion 25 and the foremost portion of the front cover plate are flush.

The rear body clamp 6 has an outer margin of slightly smaller size and the same shape as the inner wall of the shell 2 permitting the shell to telescope over it in assembly. It has tie bolt openings 34 at the thickened corners 33 for receiving the tie bolts 11.

The tap switch housing consists of two parts, the baffle 8 and cover 9. The baffle 8 is a cup-shaped baffle having a flat face plate or bottom 35 (FIG. 5) and the sides 36. At each corner of the baffle is a protruding contact support surface 37 (FIGS. 3 and 4) supporting the flat L-shaped lugs or contact elements 38. Opposite the raised portion 37 on the outside of the baffle and in the corners are the recesses 39. The contact elements or lugs 38 are secured to the inclined surface of the wall 37 by a bolt 40 extending through the wall of the portion 37 between the inside of the tap switch housing and recess 39. A lead wire from the primaries is adapted to be connected to the highly conductive contact insert 42 press fitted into the opening in wall 37. The recess 39 facilitates this connection without interference of the body clamp 6.

The switch contact element 38 is seated on the inclined surface of the contact support 37 and extends beyond the support at a spaced distance from the bottom 35. The tap switch includes four of these contact element assemblies, one located in each of the four corners.

The contact elements 38 are arranged to be engaged by a wiper switch arm 43 including two spaced elongated arms 44 biased toward each other by the spring-washers 45 and rivet 46 (FIG. 5). The elongated arms 44 are attached to a base 70.

Figure 3:
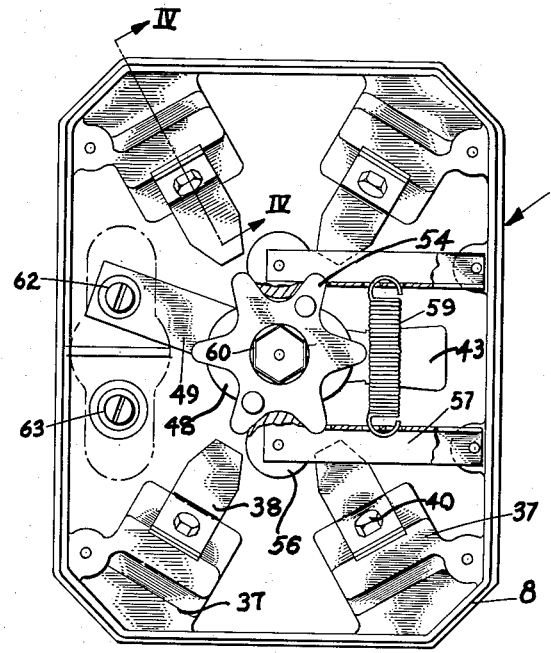
FIG. 3 is an end view of the tap switch and tap switch housing with the cover removed.
Figure 4:
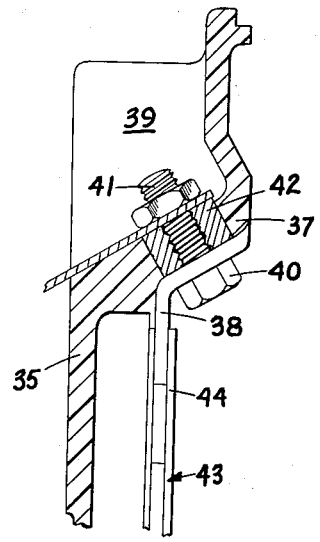
FIG. 4 is a partial, sectional view taken along the plane IV—IV of FIG. 3.

The base 70 of wiper arm 43 is rotatably mounted about a pivot bolt 47 extending upwardly from the bottom 35 of the baffle. The switch arm 43 is seated on and electrically contacts a circular boss 48 forming a part of the terminal switch 49 (FIGS. 3 and 5). A positive contact is provided between boss 48 and arm 43 by the spring washer element 71 compressing the wiper arm against the boss.

The switch arm 43 is actuated by shaft 50 having a hub 51 secured to the wiper arm 43 by screws 55. A neck 52 of the shaft extends upwardly through opening 53 in the cover plate 9. A star wheel 54 is rigidly secured to the hub 51 of the shaft. Thus, turning the shaft assembly 50 rotates the wheel and the wiper switch arm.

The wiper arm is held in predetermined position by a roller and star wheel assembly which includes the star wheel 54 and roller 56 attached to the ends of the arms 57. The arms are pivoted on the pins 58 secured to the sides 36 of the baffles. They are biased together by the spring 59 located between the point of pivotal attachment and the rollers. Thus the rollers are biased into the dwell portions of the star wheel, holding the star wheel in one position. The position of the wiper arm is changed by rotating the star wheel. This is accomplished by rotating the actuator arm 61 secured to shaft 50 at the hexagonal end 60.

The baffle 8 has two primary disconnect pins 62 and 63 (FIG. 3). Pin 62 is connected to the terminal strap 49, thus being electrically connected to the wiper switch arm 43. The other pin 63 has a threaded end 64 extending through a contact insert 72 through the baffle 8. One lead to the primaries is connected to this terminal end.

The pins 62 and 63 are adapted to receive the primary disconnect plug 65 described in more detail in my Patent No. 2,778,001 entitled Primary Disconnect Plug for Welding Transformers.

*Assembly*

This transformer is easily assembled. The primary and secondary unit is first assembled by arranging the primary and secondary loops side by side with a primary on each side of a secondary. Then the U-shaped cores are installed and clamped onto the primary and secondary unit, by straps as disclosed in the Goodrich Patent No. 2,459,374. The tie bolts 11 are installed and the clamp 5 secured to the terminal end of the primary and secondary units. Cover 10 is placed over the clamp 5, the portion of the smaller cross sections is received by clamp 5, and the openings 30 and 29 receive the conduit 21 and lugs 18, respectively. The cover is secured in place by nuts threaded on the end of the conduits 21. The rear clamp 6 is then installed on the ends of tie rods 11 opposite the clamp 5.

The tap switch and tap switch housing are assembled independently of the transformer. For brevity, the assembly of all the components will not be described. Therefore, assuming that all of the components shown in FIG. 3 are properly assembled, the cover 9 is inserted over the baffle 8 and secured thereto by screws 66. This provides a seal between the baffle 8 and the cover, completely enclosing the housing except for the primary disconnect plug opening 67. Arm 61 is installed on the shaft neck 52 extending through the sealed opening in the cover. The primary disconnect plug is then inserted and the screws 68 tightened to completely seal the entire tap switch within the enclosure formed by the baffle and the cover.

The tap switch housing 7 is installed on the rear ends of the rods 11 which completes the unit ready for use. I prefer, however, to enclose the primary and secondary in the shell. This is easily accomplished by removing the cover 9 of tap switch housing 7. The shell is then inserted over unit and the cover 9 replaced. The shell is then held in place by being clamped between the front body clamp 5 and cover 9.

*Operation*

It is not considered necessary to describe the entire operation of a transformer since such operation is common knowledge. Therefore, the description of the operation of this invention will be limited to the operation and advantages of the tap switch housing 7.

During the operation of the transformer, tremendously high currents are produced. Therefore, it is necessary that water flow through the secondary for cooling the same. No matter how water tight the secondary is, some of the moisture caused by condensation, leakage and otherwise reaches the tap housing 7. This moisture in the past has created quite a problem. In accordance with this invention, the baffle 8, which is constructed of a non-conductive, impervious material such as a polyester resin, prohibits the moisture from entering the housing. The cover sealed to the baffle also helps to produce this desired result. Consequently, water cannot enter the enclosure formed by the cover and the baffle. Thus, the electrical components inside the tap switch housing 7 are free from moisture and no short circuiting occurs. Special care has been taken in the fabrication of this housing. For example, the elongated sealing ring of the primary disconnect plug provides a water tight seal. Further, the seal 73 around the neck 52 of the shaft is provided for this purpose. The terminal ends extending from the contacts and the disconnect 10 through the baffle 8 are made absolutely water and moisture tight by sealing material.

The transformer of this invention solves the problem that has plagued the industry for sometime. It accomplishes the desired result by a simple means which has had tremendous success in reducing the cut-down time of the transformer and thus the maintenance cost.

Having described a preferred form of my invention, it should become obvious that alterations and modifications are possible within the spirit of this invention. Therefore, this invention should be limited only as expressly defined by the language of the appended claims.

I claim:

1. A water cooled transformer having an elongated housing shell having two open ends; elongated primary means and secondary means arranged side-by-side longitudinally in said shell; said primary and secondary means terminating short of one end of said shell and said secondary having an electrode extending from the other end of said shell; said secondary means including a highly conductive, metallic coil having water passageways; a rigid, water and vapor impervious, non-conductive, cup-shaped baffle; a cover on said baffle, said baffle and cover forming a separate completely enclosed housing for receiving a primary selector switch, said housing being located over the opening in said one end of said shell with the cover facing outwardly; and primary selector switch means on said cup-shaped baffle within said housing and electrically connected to said primary through said baffle for controlling the operation of said transformer and a selector switch handle mounted on the outside of said cover and operatively connected to said selector switch means through said cover for controlling the setting of said selector switch means.

2. A water cooled transformer having an elongated housing shell having two open ends; elongated primary means and secondary means arranged side-by-side longitudinally in said shell; said primary and secondary means terminating short of one end of said shell and said secondary having an electrode extending from the other end of said shell; said secondary means including a highly conductive, metallic coil having water passageways; a rigid, water and vapor impervious, non-conductive, cup-shaped baffle; a cover on said baffle; said baffle and cover forming a separate completely enclosed housing for receiving a primary selector switch, said housing being located over the opening in said one end of said shell with the cover facing outwardly; and primary selector switch means on said cup-shaped baffle within said housing and electrically connected to said primary through said baffle for controlling the operation of said transformer; said primary selector switch means including electrical contacts mounted in said baffle and having terminals extending through said baffle in sealed relationship thereto and connected to said primary means; a switch arm adapted to contact said terminals; a selector switch handle mounted on the outside of said cover and operatively connected to said switch arm through said cover for controlling the position of said switch arm to determine which terminal it is contacting; primary connection means directly connected to said switch arm and connected to said primary means through a terminal sealed in said baffle; said primary connection means being adapted to be connected to an exterior source of power.

3. A water cooled transformer having an elongated housing shell having two open ends; elongated primary means and secondary means arranged side-by-side longitudinally in said shell; said primary and secondary means terminating short of one end of said shell and said secondary having an electrode extending from the other end of said shell; said secondary means including a highly conductive, metallic coil having water passageways; a rigid, non-conductive cup-shaped baffle; a cover on said baffle; said baffle and cover forming a separate completely enclosed housing for receiving a primary selector switch, said housing being located over the opening in said one end of said shell with the cover facing outwardly and primary selector switch means on said baffle within said enclosure unit and electrically connected to said primary through said baffle for controlling the operation of said transformer; and a selector switch handle mounted on the outside of said cover and operatively connected to said selector switch means through said cover for controlling the setting of said selector switch means.

4. A water cooled transformer having an elongated housing shell having two open ends; elongated primary means and secondary means arranged side-by-side longitudinally in said shell; said primary and secondary means terminating short of one end of said shell and said secondary having an electrode extending from the other end of said shell; said secondary means including a highly conductive, metallic coil having water passageways; a rigid, non-conductive, cup-shaped baffle; a cover on said baffle; said baffle and cover forming a separate completely enclosed housing for receiving a primary selector switch, said housing being located over the opening in said one end of said shell with the cover facing outwardly and primary selector switch means on said baffle within said enclosure and electrically connected to said primary through said baffle for controlling the operation of said transformer; said primary selector switch means including electrical contacts mounted in said baffle and having terminals extending through said baffle and connected to said primary means; a switch arm adapted to contact said terminals; a selector switch handle mounted on the outside of said cover and operatively connected to said switch arm through said cover for controlling the position of said switch arm to determine which terminal it is contacting; primary connection means directly connected to said switch arm and connected to said primary means through a terminal in said baffle; said primary connection means being adapted to be connected to an exterior source of power.

5. A water cooled transformer having an elongated housing shell having an opening in at least one end; elongated primary means and secondary means arranged side-by-side longitudinally in said shell; said primary and secondary means terminating short of one end of said shell and said secondary having an electrode extending through the opening in said one end of said shell; said secondary means including a highly conductive, metallic coil having water passageways; a second opening adjacent the opposite end of said shell providing access to said primary and secondary means; a rigid, water and vapor impervious, non-conductive, cup-shaped baffle; a cover on said baffle; said baffle and cover forming a separate completely enclosed housing for receiving a primary selector switch, said housing being located over said second opening with the cover facing outwardly; and primary selector switch means on said cup-shaped baffle within said housing and electrically connected to said primary through said baffle for controlling the operation of said transformer; said primary selector switch means including electrical contacts mounted in said baffle and having terminals extending through said baffle in sealed relationship thereto and connected to said primary means; a switch arm adapted to contact said terminals; a selector switch handle mounted on the outside of said cover and operatively connected to said switch arm through said cover for controlling the position of said switch arm to determine which terminal it is contacting; primary connection means directly connected to said switch arm and connected to said primary means through a terminal sealed in said baffle; said primary connection means being adapted to be connected to an exterior source of power.

References Cited in the file of this patent

UNITED STATES PATENTS

| | | |
|---|---|---|
| 1,779,365 | Von Henke | Oct. 21, 1930 |
| 2,170,700 | Von Henke | Aug. 22, 1939 |
| 2,173,387 | Bale | Sept. 19, 1939 |
| 2,556,602 | Schwartz | June 12, 1951 |
| 2,644,067 | Watson | June 30, 1953 |
| 2,843,822 | Scott | July 15, 1958 |